United States Patent [19]
Elyakim

[11] Patent Number: 4,477,100
[45] Date of Patent: Oct. 16, 1984

[54] FIFTH WHEEL COUPLING APPARATUS

[76] Inventor: Amir Elyakim, 10/9 Hashomron St., Bat Yam, Israel

[21] Appl. No.: 326,341

[22] Filed: Dec. 1, 1981

[30] Foreign Application Priority Data

Dec. 2, 1980 [IL] Israel .................................. 61613
Nov. 2, 1981 [IL] Israel .................................. 64182

[51] Int. Cl.$^3$ ............................................. B62D 53/12
[52] U.S. Cl. .................................................. 280/434
[58] Field of Search ........................ 280/432, 433, 434

[56] References Cited

U.S. PATENT DOCUMENTS

| | | | |
|---|---|---|---|
| 3,463,512 | 8/1969 | Hodgson | 280/433 |
| 3,743,054 | 7/1973 | Jones, Jr. | 280/433 |
| 3,888,514 | 6/1975 | Klein | 280/434 |
| 4,140,328 | 2/1979 | Fontaine | 280/434 |

*Primary Examiner*—David M. Mitchell
*Assistant Examiner*—Kenneth R. Rice
*Attorney, Agent, or Firm*—Lowe, King, Price & Becker

[57] ABSTRACT

Fifth wheel coupling apparatus including a trailer receiving plate mountable on a vehicle chassis and defining a receiving slot for accepting a trailer pin, a pin locking mechanism mounted onto the plate and comprising a generally stationary portion and a moving portion which is configured for sliding engagement with the trailer pin, the moving portion comprising a first sliding element which defines an inclined surface and a second sliding element arranged for engagement with the inclined surface at a first location therealong during locking engagement with a trailer pin and at a second location therealong when not in locking engagement therewith. The second sliding element engages a significant portion of the circumference of the trailer pin when in a locking engagement.

14 Claims, 6 Drawing Figures

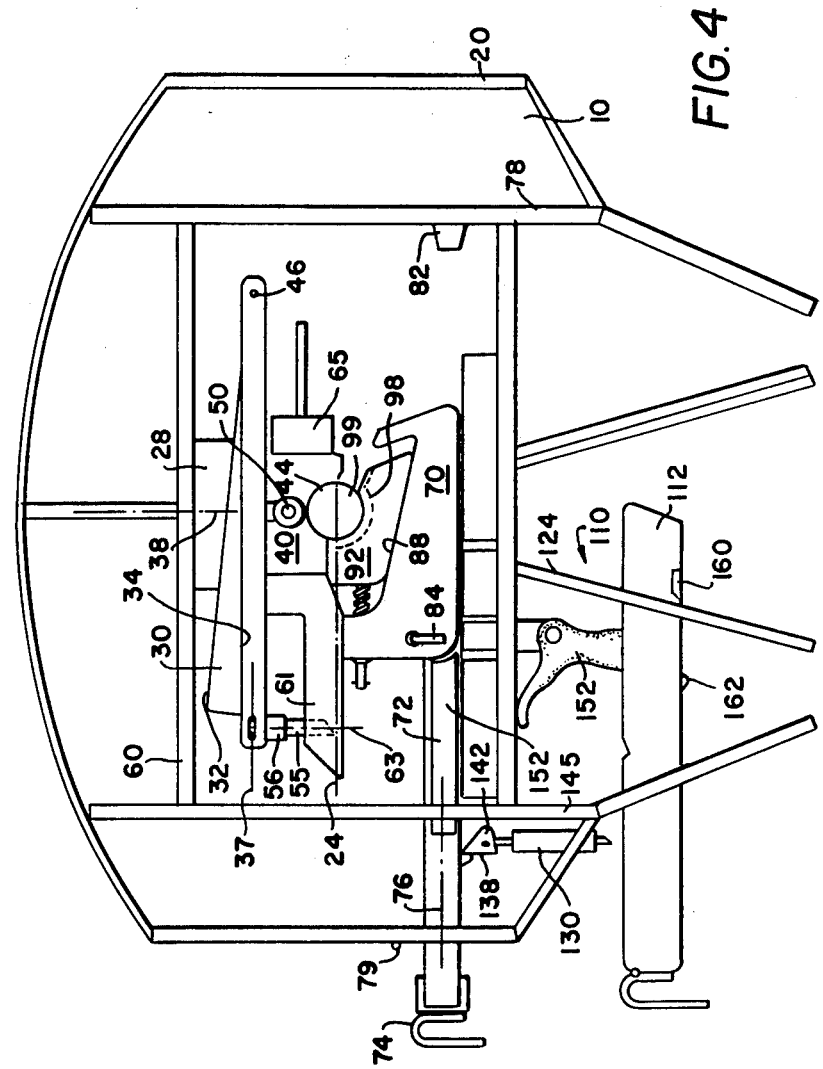

FIFTH WHEEL COUPLING APPARATUS

FIELD OF THE INVENTION

The present invention relates to couplings for articulated vehicles and more particularly to devices for coupling a tractor vehicle to a trailer or semi-trailer, commonly known as fifth wheel couplings.

BACKGROUND OF THE INVENTION

A large variety of fifth wheel couplings are known in the patent literature and on the marketplace. Generally these comprise a plate having a rearward facing slot for receipt of a pin extending downwardly from a trailer, and a locking mechanism for automatically locking the trailer pin against removal once the pin is inserted a predetermined amount into the slot. The plate is usually provided with recesses to receive grease, which is manually applied.

Fifth wheel coupling devices should be of sturdy build, easy to couple and uncouple, and should hold securely the trailer in coupled position. However, practical experience has shown that conventional fifth wheel couplings require a significant amount of maintenance due to wear resulting in costly downtime for the vehicle operator. It is also known that under certain circumstances, the locking mechanism of the fifth wheel coupling fails, permitting disengagement of the trailer from the truck pulling it with disasterous results. An even more serious problem of conventional fifth wheel couplings is the lack of release mechanism in the event the trailer overturns. This means that the tractor pulling it is overturned with the trailer.

SUMMARY OF THE INVENTION

The present invention seeks to provide a fifth wheel coupling which overcomes the disadvantages of the prior art fifth wheel couplings discussed above, which requires much less maintenance than conventional fifth wheel couplings and which comprises a locking mechanism that is much less prone to failure than conventional locking mechanisms.

There is thus provided in accordance with an embodiment of the present invention fifth wheel coupling apparatus comprising a trailer receiving plate mountable on a vehicle chassis and defining a receiving slot for accepting a trailer pin, a pin locking mechanism mounted onto the plate and comprising a generally stationary portion and a moving portion which is configured for sliding engagement with said trailer pin, the moving portion comprising a first sliding element which defines an inclined surface and a second sliding element arranged for engagement with said inclined surface at a first location therealong during locking engagement with a trailer pin and at a second location therealong when not in locking engagement therewith. This arrangement enables the second sliding element to engage a significant portion of the circumference of the trailer pin when in a locking engagement.

Further in accordance with an embodiment of the invention there is provided fifth wheel coupling apparatus comprising a pin locking mechanism comprising a generally stationary portion whose position may be adjusted to take into account parts wear.

According to a preferred embodiment of the invention, the generally stationary portion of the pin locking mechanism comprises an eccentric member which permits adjustment of the generally stationary portion to taken into account parts wear.

Further according to an embodiment of the present invention, there is provided a second locking mechanism which is automatically operated by the pin locking mechanism.

Additionally in accordance with an embodiment of the invention there is provided fifth wheel coupling apparatus comprising a trailer receiving plate having a plurality of recesses formed therein for grease retention and means for supplying grease to the recesses through a system of conduits from a central grease reservoir.

Still further in accordance with an embodiment of the invention there is provided fifth wheel coupling apparatus comprising a pin locking mechanism comprising a generally stationary portion and a moving portion, and a plate underlying the stationary and moving portions which is adapted to disengage from the trailer receiving plate when subjected to a certain moment by the trailer pin to prevent overturning of the tractor with the trailer.

BRIEF DESCRIPTION OF THE DRAWINGS

The present invention will be more fully understood and appreciated from the following detailed description taken in conjunction with the drawings in which:

FIG. 4 is a plan view illustration of the bottom of the fifth wheel coupling apparatus of the present invention illustrating the locking mechanism thereof in an intermediate orientation;

FIG. 5 is a side view illustration of the apparatus of FIGS. 1-4; and

FIG. 6 is a plan view illustration of the bottom of an alternate embodiment of the fifth wheel coupling apparatus of the present invention.

Figure 1:
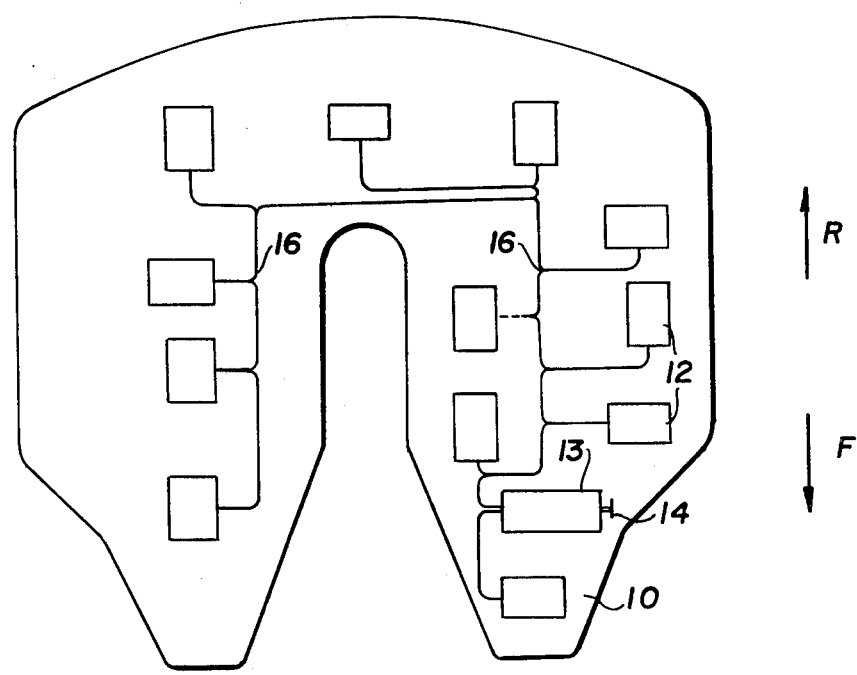
FIG. 1 is a plan view illustration of the top of the fifth wheel coupling apparatus of the present invention.

For purposes of the detailed description of the invention, "rearward" refers to the direction indicated by arrow R on FIG. 1, "forward" refers to the direction indicated by arrow F on FIG. 1, and with reference to FIGS. 2-6, "upward" indicates the direction into the paper, and "downward" indicates the direction out of the paper.

DETAILED DESCRIPTION OF THE INVENTION

Reference is now made to FIG. 1 which illustrates the top of the fifth wheel coupling apparatus of the present invention, including a receiving plate 10 which is formed with a plurality of recesses 12 distributed along the area thereof for retaining grease and releasing such grease as a trailer bottom plate slides thereover. In accordance with an embodiment of the present invention, there is provided a grease reservoir 13 with an associated piston 14 which is connected to the individual recesses 12 by a network of conduits 16. Regreasing of the receiving plate 10 may be effected simply by operation of the piston 14, obviating the need for manual greasing required by conventional fifth wheel couplers.

The construction and operation of the locking mechanism of the present invention will now be described in detail with reference to FIGS. 2-5 in which like elements have like reference numerals.

The locking mechanism is mounted on structural elements supporting the receiving plate 10 and forming part of the receiving plate assembly indicated generally by reference numeral 20. Receiving plate assembly 20 is rotatably mounted by a pair of bearing mounts 22 for rotation about an axis 24.

The locking mechanism comprises a generally stationary portion including a generally resilient pillow element 28, typically formed of metal, a plate 40 and wedge member 30, slidably mounted between pillow element 28 and plate 40. Wedge member 30 has first and second elongate surfaces 32 and 34 which are inclined one with respect to the other so it can be pulled into the gap between pillow element 28 and plate 40 to a greater or lesser extent. Wedge member 30 is fixedly attached to an elongate threaded rod 36 which engages receiving plate assembly 20 and extends outwardly thereof such that the position of wedge member 30 in the gap may be determined by manual positioning of rod 36. It may be appreciated that the stationary portion described hereinabove including wedge member 30 is provided in accordance with a preferred embodiment of the present invention to permit repositioning of the stationary portion of the locking mechanism to take into account wear in elements of the locking mechanism which will be described hereinafter.

Plate assembly 20 and plate 40 define a receiving socket 42 which terminates in a curved seating portion 44 having a semicircular configuration which corresponds to the configuration of the cross section of the trailer pin. This seating portion is one of the portions of the locking mechanism which is subject to wear after prolonged use and thus requires repositioning to avoid excess play in the locking mechanism. Guide members 61 and 65, which are fixed to plate 10, help to support plate 40 against stresses applied thereto by the trailer pin in operation.

Across plate 40 lies trigger arm 48 having an engagement portion 50 extending therefrom about halfway along the length thereof. Trigger arm 48 is pivoted to plate assembly 20 at pivot location 46. Adjacent the end of arm 48 there is formed a slot 52 to which is slidably attached a rod 54 which terminates in a catch pin 55, whose operation will be described hereinafter. Rod 54 is formed with a collar 56 against which is seated a spring 58 which is also seated against a bulkhead 60 forming part of the receiving plate assembly 20. Spring 58 urges the rod 54 forwardly, as defined in the Brief Description. Rod 54 terminates in a handle 62 extending outside of plate assembly 20 and which permits the rod to be pulled rearwardly against the urging of spring 58. A spring 59 couples arm 48 to plate assembly 20 so as to urge portion 50 forwardly. A guide socket 63 for passage of catch pin 55 therethrough is provided in guide member 61.

The sliding portion of the locking mechanism comprises a first sliding element 70 which is arranged for slidable movement along an axis 76 parallel to axis 37 and which defines an extension of an arm 72 which terminates in a manually engagable handle 74. Sliding element 70 is urged inwardly towards a bulkhead 78 forming part of the plate assembly 20 by means of a tension spring 80 which is attached at respective opposite ends to an attachment member 82 fixed to bulkhead 78 and to an attachment member 84 attached to sliding element 70.

Figure 2:
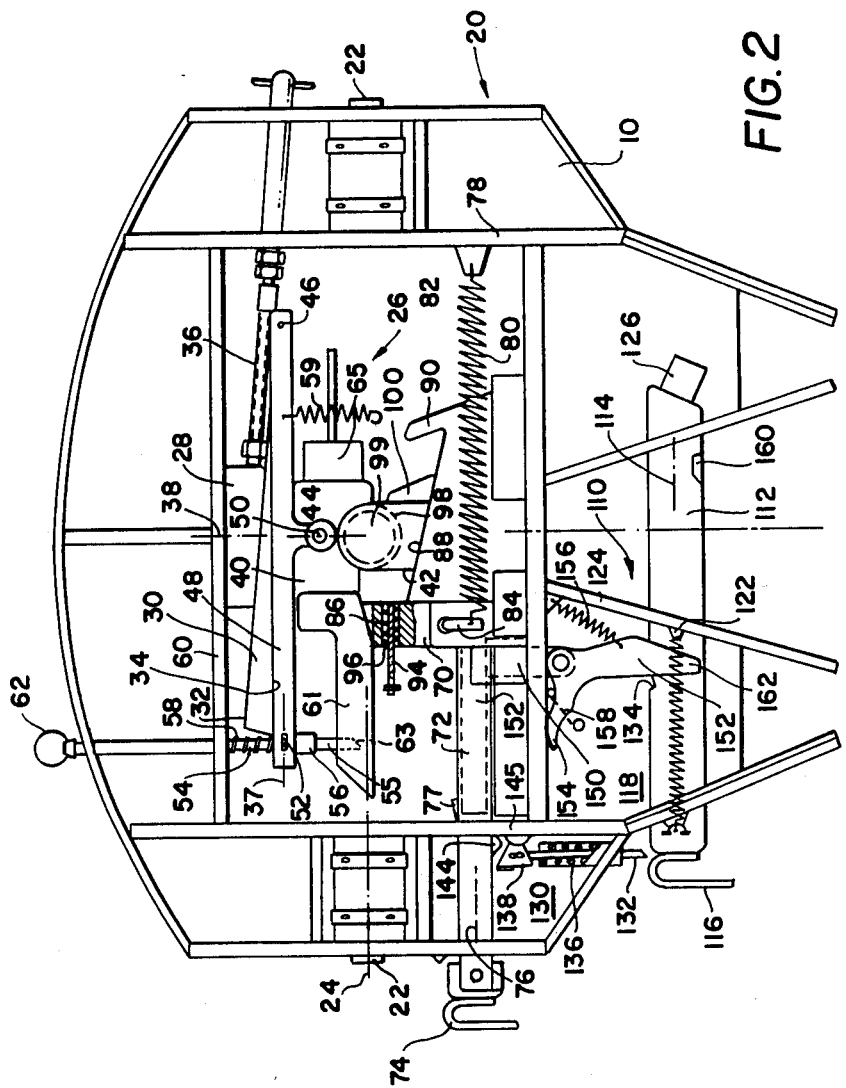
FIG. 2 is a plan view illustration of the bottom of the fifth wheel coupling apparatus of the present invention illustrating the locking mechanism thereof in a locked orientation.

Sliding element 70 comprises a heel portion 86, which extends in a direction perpendicular to axis 76 by a distance reaching almost to the bottom surface of guide member 61, and an inclined toe portion 90 and is defined by a top surface 88 which extends generally parallel to axis 38 alongside heel portion 86 and then continues in a downward inclined direction in the sense of FIG. 2 until it terminates at inclined toe portion 90.

A second sliding element 92 is arranged for slidable engagement with the top surface 88 of sliding element 70 and for being supported thereby. Second sliding element 92 is coupled by means of a spring loaded rod 94 to the heel portion 86 of sliding element 70 and is urged by a spring 96 inwardly towards toe portion 90. Second sliding element 92 is provided with a top surface which includes a curved portion 98 defining a circular configuration which corresponds to the cross sectional configuration of a trailer pin, indicated by reference numeral 99, and a toe portion 100.

Figure 3:
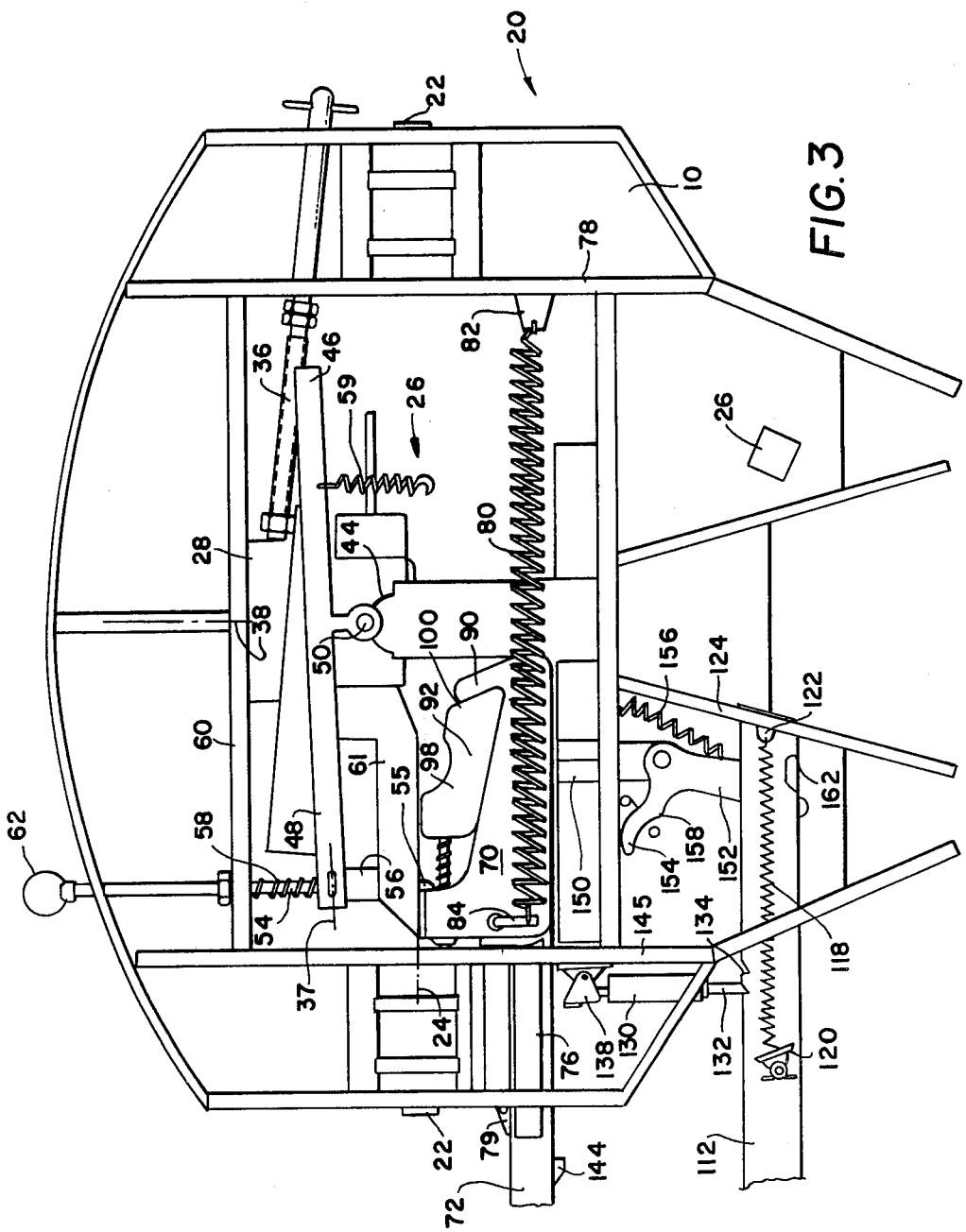
FIG. 3 is a plan view illustration of the bottom of the fifth wheel coupling apparatus of the present invention illustrating the locking mechanism thereof in an intermediate orientation.

The cooperative action of sliding element 70 and second sliding element 92 to lock a trailer pin 99 in place can be seen by comparing FIGS. 2-4. FIG. 3 shows the locking mechanism in an open position. A protrusion 77 formed an arm 72 for engagement with a protrusion 79 formed on the plate assembly 20 serves as a catch for arm 72 in the retracted orientation. This catch is engaged when arm 72 is manually retracted, as shown in FIG. 3, leaving spring 80 under tension. In addition, heel portion 86 is engaged by catch pin 55 helping to maintain sliding element 70 in a retracted position. Second sliding element 92 abuts against toe portion 90 of sliding element 70, and both sliding elements are withdrawn from the slot for receipt of the trailer pin, permitting the trailer pin to either be inserted or removed. It will be noted that in this open orientation, engagement portion 50 of trigger arm 48 protrudes into seating portion 44.

As a trailer pin 99 enters seating portion 44 for coupling, it engages engagement portion 50 causing trigger arm 48 to pivot slightly in a clockwise sense around pivot location 46. This causes catch pin 55 to move rearwardly, releasing heel portion 86 of sliding element 70. At the same time, the catch formed by protrusion 77 on arm 72 is automatically released by engagement of the trailer pin with toe portion 90 of element 70 as it passes thereby. Thus, as illustrated in FIG. 4, sliding element 70 moves inwardly under the pull tension spring 80 bringing second sliding element 92 into engagment with trailer pin 99. Second sliding element 92 is further urged against trailer pin 99 by spring loaded rod 94 which is tensioned in the locking orientation.

As seen in FIG. 2, sliding element 70 continues to move inwardly until second sliding element 92 abuts against heel portion 86. In this orientation, curved portion 98 of second sliding element 92 completely engages trailer pin 99 with toe portion 100 extending behind the foremost portion of trailer pin 99. It is confined in this position both by the urging of spring loaded rod 94 and by tension spring 80 which continues to urge sliding element 70 inwardly. In this orientation, trailer pin 99 is secured in place. Unlike prior art sliding elements which pivoted open and shut, second sliding element 92 cannot be moved by rearward pressure from trailer pin 99 because it is supported by inclined top surface 88 of sliding element 70. Thus, second sliding element 92 engages the trailer pin when it abuts against heel portion 86 of sliding element 70 and is only able to pass around trailer pin 99 when it abuts against toe portion 90 of first sliding element 70.

A second locking mechanism 110 is provided as an emergency back up and comprises a bar 112 which is arranged for slidable motion along an axis 114, parallel to axis 37, and is provided at an outer end thereof with a manually engageable handle portion 116. A spring 118 is mounted at one end thereof onto a mounting location 120 formed on bar 112 and at a second end thereof onto a mounting location 122 mounted on a bulkhead 124 forming part of plate assembly 20. Spring 118 is operative to urge bar 112 inwardly into engagement with a fixed stop member 126. In this orientation, bar 112 extends across the tapered opening to receiving slot 42 and prevents disengagement of the trailer pin 99 therefrom.

It is a particular feature of the present invention that the second locking mechanism is operationally connected with the main locking mechanism described previously, such that locking of the main locking mechanism also automatically results in locking of the second locking mechanism.

The automatic locking of the second locking mechanism is provided by a spring loaded catch pin assembly 130 including a catch pin 132 which normally engages a notch 134 formed in bar 112 when the bar is in a retracted position such that notch 134 lies directly in front of catch pin 132. A spring 136 in assembly 130 urges the catch pin 132 forward such that it engages notch 134.

Catch pin 132 is coupled at its opposite end to a cam follower 138 which is pivotably mounted onto a bulkhead 145 about a pivot axis 142. A protruding cam 144 is formed on the bottom surface of arm 74 and is arranged to engage cam follower 138 as it slides inwardly under the influence of spring 80. This engagement causes cam follower 138 to rotate under its pivot axis 142 in a clockwise manner, thus moving catch pin 132 rearwardly and causing its disengagement from notch 134, thus releasing bar 112 and allowing it to move inwardly into locking engagement under the influence of spring 118.

It is also a particular feature of the present invention that arm 72 cannot be moved out of locking position without first unlocking the second locking mechanism, by retracting bar 112. This mechanism is provided by means of a locking bar 150 which engages a recess 152 formed in arm 72. Locking bar 150 is pivotably mounted onto an L-shaped member 152 which is pivotably mounted about a pivot location 154 fixed with respect to the plate assembly 20 and which is coupled to the plate assembly 20 by a pair of springs 156 and 158 which urge the member 152 towards a position in which locking bar 150 engages arm 72 preventing unlocking thereof.

Bar 112 is formed with a protruding cam 160 which engages a cam follower surface 162 of member 152 such that when bar 112 is retracted out of locking orientation, member 152 is rotated about its pivot location 154 in a clockwise sense, causing retraction of locking bar 150 and permitting unlocking of the main locking mechanism by retraction of arm 74.

FIG. 6 shows a preferred embodiment of the fifth wheel coupling device of the present invention in which the generally stationary portion of the locking mechanism is modified. In this embodiment, the generally stationary portion of the locking mechanism comprises a plate 140 and an eccentric member 135 which rests between plate 140 and circular pin 128 which is welded to receiving plate assembly 20 and which defines a track about which eccentric member 135 rotates. Plate 140 is provided with a top surface including an arcuate configuration which mates with the lower surface of eccentric member 135. Eccentric member 135 is coupled by spring 131 to attachment member 132 attached to receiving plate assembly 20. Eccentric member 135 is fixedly attached at its other end to an elongate threaded rod 136 which engages receiving plate assembly 20 and extends outwardly thereof such that the position of eccentric member between track 128 and plate 140 may be determined by manual positioning of rod 136. The stationary portion described hereinabove permits repositioning of the stationary portion of the locking mechanism to take into account wear in elements of the locking mechanism described earlier, such as seating portion 44 of receiving socket 42.

The sliding portion of the locking mechanism in FIG. 6 is identical to that shown and described in FIGS. 2-4. It is a particular feature of this embodiment that the stationary portion of the locking mechanism cannot be moved except by manual positioning of rod 136. Unlike wedge members, the eccentric member can not be forced to change its position by pressure from the entering trailer pin, so this embodiment of the fifth wheel coupling is sturdier than couplings without an eccentric member.

An additional safety feature is provided by an underlying plate 170 which lies below sliding elements 70 and 92 and extends on either side of receiving socket 42. Underlying plate 170 is bolted at its rearmost end to guide members 61 and 65, and its front extensions slide into slots 190 provided in bulkhead 180 forming a part of receiving plate assembly 20. This underlying plate thus serves to hold the other elements in place (most notably second sliding element 92 which is not fixed to plate assembly 20). In the event that the trailer begins to overturn, the pin 99 exerts a certain force creating a bending moment on underlying plate 170. Underlying plate 170 slides out from slots 190 in bulkhead 180 permitting second sliding element 92 to fall downwards and freeing the trailer pin, thereby disconnecting the tractor from the trailer portion. This acts to prevent the tractor from overturning.

I claim:

1. Fifth wheel coupling apparatus comprising:
   a trailer receiving plate mountable on a vehicle chassis and defining a receiving slot for accepting a trailer pin;
   a pin locking mechanism mounted onto said plate and comprising
      a generally stationary portion and
      a moving portion configured for sliding engagement with said trailer pin, said moving portion comprising
         a first sliding element which defines an inclined surface; and
         a second sliding element arranged for engagement with said inclined surface at a first location therealong during locking engagement with a trailer pin and at a second location therealong when not in locking engagement therewith; and
   a second locking mechanism, said second locking mechanism being operated automatically by said first mentioned locking mechanism.

2. Fifth wheel coupling apparatus according to claim 1 wherein said generally stationary portion may be adjusted to take into account parts wear.

3. Fifth wheel coupling apparatus according to claim 1 and wherein said generally stationary portion comprises an eccentric member which permits adjustment of the generally stationary portion to take into account parts wear.

4. Fifth wheel coupling apparatus according to claim 1 and wherein the first and second sliding elements are spring loaded.

5. A fifth wheel coupling apparatus according to claim 1 wherein said trailer receiving plate comprises a plurality of recesses formed therein for grease retention; said apparatus also comprising
- means for supplying grease to said recesses through a system of conduits; and
- a central grease reservoir coupled to said system of conduits.

6. Fifth wheel coupling apparatus according to claim 1 or claim 4 and wherein said second sliding element is configured to have a surface corresponding to the cross sectional configuration of a part of the trailer pin.

7. Fifth wheel coupling apparatus comprising:
- a trailer receiving plate mountable on a vehicle chassis and defining a receiving slot for accepting a trailer pin;
- a pin locking mechanism mounted onto said plate and comprising
  - a generally stationary portion and
  - a moving portion configured for sliding engagement with said trailer pin; and
- a plate underlying said stationary portion and part of said moving portion being adapted to disengage from the trailer receiving plate when subjected to a certain force by the trailer pin when the trailer begins to overturn.

8. Apparatus according to claim 7 and wherein said moving portion comprises:
- a first sliding element which defines an inclined surface; and
- a second sliding element arranged for engagement with said inclined surface at a first location therealong during locking engagement with a trailer pin and at a second location therealong when not in locking engagement therewith.

9. Fifth wheel coupling apparatus according to claim 8 and wherein said first and second sliding elements are spring loaded.

10. Fifth wheel coupling apparatus according to claim 8 and wherein said second sliding element is configured to have a surface corresponding to the cross section configuration of a part of the trailer pin.

11. Fifth wheel coupling apparatus according to claim 7 and wherein said generally stationary portion is adjustable to take into account parts wear.

12. Fifth wheel coupling apparatus according to claim 7 and wherein said generally stationary portion comprises an eccentric member which permits adjustment of the generally stationary portion to take into account parts wear.

13. Fifth wheel coupling apparatus according to claim 7 and further comprising a second locking mechanism, said second locking mechanism being operated automatically by said first mentioned locking mechanism.

14. Fifth wheel coupling apparatus comprising:
- a trailer receiving plate mountable on a vehicle chassis and defining a receiving slot for accepting a trailer pin;
- a pin locking mechanism mounted onto said plate and comprising
  - a generally stationary portion and
  - a moving portion configured for sliding engagement with said trailer pin, said moving portion comprising
    - a first sliding element which defines an inclined surface; and
    - a second sliding element arranged for engagement with said inclined surface at a first location therealong during locking engagement with a trailer pin and at a second location therealong when not in locking engagement therewith;
- and wherein said generally stationary portion comprises an eccentric member which permits adjustment of the generally stationary portion to take into account parts wear.

* * * * *